United States Patent [19]

Hayashi

[11] Patent Number: 4,547,180

[45] Date of Patent: Oct. 15, 1985

[54] CRANKSHAFT PULLEY OF ENGINE

[75] Inventor: Yoshimasa Hayashi, Kamakura, Japan

[73] Assignee: Nissan Motor Co., Ltd., Yokohama City, Japan

[21] Appl. No.: 411,020

[22] Filed: Aug. 24, 1982

[30] Foreign Application Priority Data

Aug. 27, 1981 [JP] Japan .................. 56-134709

[51] Int. Cl.[4] ............................. F16H 55/12
[52] U.S. Cl. .................. 474/159; 474/164; 474/171
[58] Field of Search .......... 474/84, 169, 170, 171, 474/158–160, 164, 166; 29/159 R

[56] References Cited

U.S. PATENT DOCUMENTS

| 1,196,937 | 9/1916 | Evans | 474/159 |
| 3,217,552 | 11/1965 | Daub | 474/159 X |
| 3,722,309 | 3/1973 | Shaffer | 29/159 R X |
| 3,962,926 | 6/1976 | Kotlar | 29/159 R X |
| 3,994,181 | 11/1976 | Sproul | 29/159 R X |
| 4,373,480 | 2/1983 | Shikata et al. | 474/84 X |

FOREIGN PATENT DOCUMENTS

| 2800561 | 7/1979 | Fed. Rep. of Germany . | |
| 2337284 | 7/1977 | France | 474/159 |
| 2470308 | 5/1981 | France . | |
| 1089468 | 11/1967 | United Kingdom . | |
| 2067660A | 7/1981 | United Kingdom . | |

Primary Examiner—James A. Leppink
Assistant Examiner—Frank H. McKenzie, Jr.
Attorney, Agent, or Firm—Schwartz, Jeffery, Schwaab, Mack, Blumenthal & Evans

[57] ABSTRACT

A crankshaft pulley of an internal combustion engine, comprises a first pulley section for use with a V-belt to drive an engine accessory, the first pulley section being formed of sheet metal, and a second pulley section for use with a cogged belt to drive a camshaft of the engine, the second pulley section being formed of sheet metal and integral at at least a part thereof with the first pulley section, thereby greatly reducing engine weight while contributing to noise reduction.

4 Claims, 3 Drawing Figures

CRANKSHAFT PULLEY OF ENGINE

BACKGROUND OF THE INVENTION

1. Field of the Invention

This invention relates to an improvement in a crankshaft pulley attached to an end of a crankshaft of an automotive internal combustion engine, and more particularly to the crankshaft pulley formed of sheet metal.

2. Description of the Prior Art

Automotive internal combustion engines are provided with crankshaft pulley fixedly attached at one end of a crankshaft. For example, in overhead camshaft engines, the drive of a camshaft has been conventionally achieved by the crankshaft pulley through a chain passed on both the camshaft and crankshaft pulley. In recent years, a cogged belt (cogged timing belt) is used extensively in place of the chain, which cogged belt is passed over a toothed pulley of the crankshaft pulley. However, such a crankshaft pulley is usually formed of cast iron or sintering metal, and therefore is larger in weight, thereby preventing engine weight reduction. Besides, the rigidity of the crankshaft pulley is not high enough to justify its larger weight.

SUMMARY OF THE INVENTION

A crankshaft pulley of an internal combustion engine, according to the present invention comprises a first pulley section for use with a V-belt to drive engine accessories. The first pulley section is formed of sheet metal. Accordingly, a second pulley section is provided for use with a cogged belt to drive a camshaft. The second pulley section is also formed of sheet metal and at least a part thereof is integral with the first pulley section. Accordingly, such a crankshaft pulley is largely reduced in weight as compared with conventional ones, thereby achieving engine weight reduction while contributing to noise reduction.

BRIEF DESCRIPTION OF THE DRAWINGS

The features and advantages of the crankshaft pulley according to the present invention will be more fully appreciated from the following description taken in conjunction with the accompanying drawings in which the same reference numerals designate corresponding parts and elements, and in which:

FIGS. 2 and 3 are views of a preferred embodiment of a crankshaft pulley in accordance with the present invention, in which FIG. 2 is a sectional view taken in the direction of the arrows substantially along the line II—II of FIG. 3, and FIG. 3 is a sectional view taken in the direction of the arrows substantially along the line III—III of FIG. 2.

DETAILED DESCRIPTION OF THE INVENTION

Figure 1:
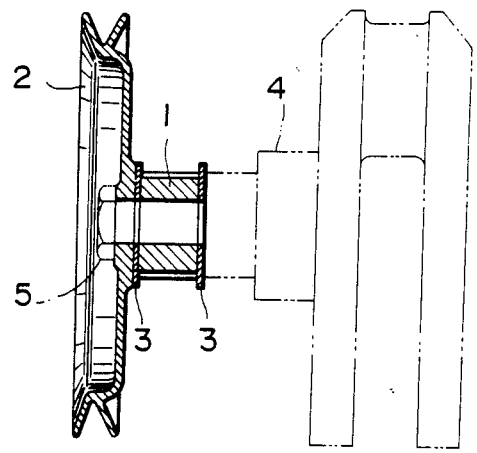
FIG. 1 is a sectional view of a conventional crankshaft pulley.

To facilitate understanding the present invention, brief reference will be made to a conventional crankshaft pulley, depicted in FIG. 1. Referring to FIG. 1, the conventional crankshaft pulley includes a toothed pulley 1 for use with a cogged belt to drive a camshaft, and another pulley 2 for use with a V-belt to drive engine accessories such as a water pump and an alternator. These pulleys 1, 2 are formed independent from each other by casting, or molding of sintering metal. The thus formed pulleys 1, 2 are located side-by-side, positioning two flange plates 3, 3 at the opposite end faces of the pulley 1, and then secured onto the tip section of a crankshaft 4 by means of a bolt 5.

However, since such a crankshaft pulley is formed of cast metal or sintering metal, it unavoidably is heavier in weight, thereby preventing engine weight reduction. Besides, such a crankshaft pulley is not high in rigidity for its weight, and accordingly it might vibrate as the cone of a loudspeaker, thereby developing noise.

Figure 2:
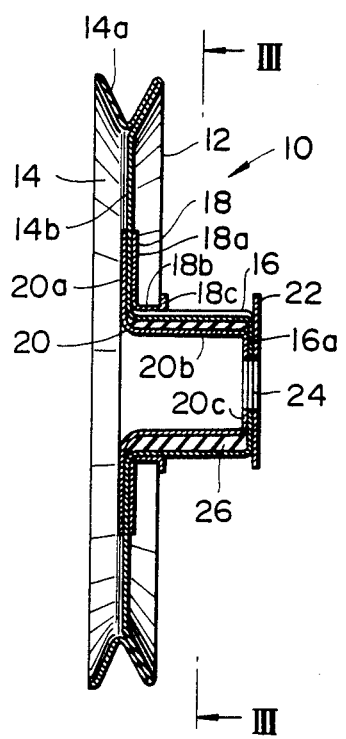
Figure 3:
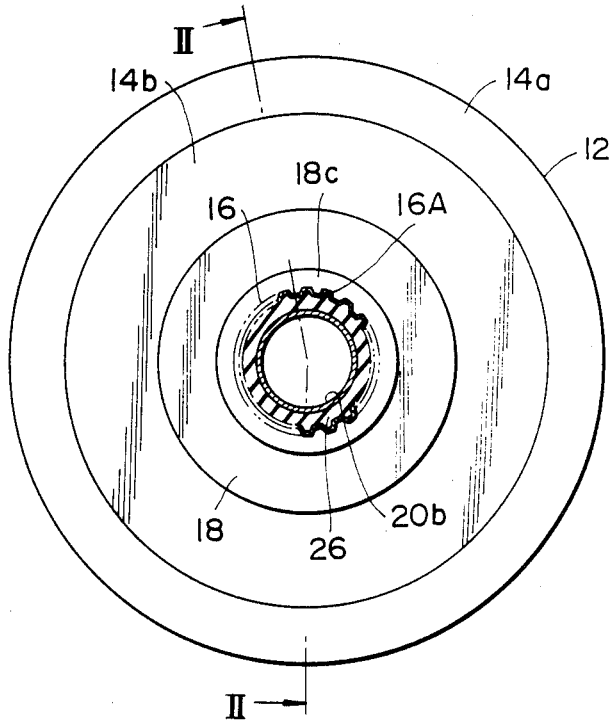

In view of the above description of the conventional crankshaft pulley, reference is now made to FIGS. 2 and 3, wherein a preferred embodiment of a crankshaft pulley of the present invention is illustrated by the reference numeral 10. The crankshaft pulley 10 is composed of a main body 12 which is formed of sheet metal of mild steel and includes first and second pulley sections 14, 16. The first pulley section 14 is provided with an annular groove portion 14a which is V-shaped in cross-section and formed by bending the peripheral part of a circular blank of sheet metal. The first pulley section 14 is for use with a V-belt (not shown) in order to drive engine accessories such as a water pump and/or an alternator though not shown. The first pulley section 14 has an annular flat portion 14b whose outer periphery is provided with the above-mentioned annular groove portion 14a. The flat portion 14b will be so located that the axis of a crankshaft (not shown) is perpendicular thereto when the crankshaft pulley 10 is installed to one end of the crankshaft.

The second pulley section 16 is generally cylindrical and integral with the annular flat section 14b of the first pulley section 14 in such a manner that the axis of the second pulley section is perpendicular to the flat portion 14b. The second cylindrical pulley section 16 is formed by drawing the central part of the above-mentioned circular blank of sheet metal into the cylindrical form. Additionally, the second pulley section 16 is formed at its cylindrical surface with a plurality of teeth 16A each of which extends along the axis of the cylindrical second pulley section 16. The teeth 16A are formed, for example, by bulging the wall of the second pulley section 16. Accordingly, this second pulley section 16 is for use with a cogged belt (not shown) in order to drive a camshaft (not shown).

In this embodiment, a generally annular reinforcement plate member 18 is disposed in the vicinity of a connecting part (no numeral) at which the first pulley section flat portion 14b and the second pulley section 16 are integrally connected with each other. The reinforcement plate member 18 has an annular flat portion 18a, and a cylindrical portion 18b. The flat portion 18a contacts the first pulley section flat portion 14b, while the cylindrical portion 18b contacts with the second pulley section 16. The cylindrical portion 18b is formed with a flange 18c which serves as a guide for the cogged belt. Additionally, another reinforcement plate member 20 is disposed at the opposite side surface of the main body 12 relative to the reinforcement plate member 18. The reinforcement plate member 20 has an annular flat portion 20a, and a cylindrical portion 20b. The flat portion 20a securely contacts the first pully section flat portion 14b of the main body 12, while the cylindrical portion 20b securely contacts with the second pulley section 16. Both the reinforcement plate members 18, 20 are fixed, by spot welding, onto the main body 12 which is interposed therebetween, so that the main body 12, and both the reinforcement members 18, 20 serve as a single unit.

A flange plate member 22 serving as another guide for the cogged belt is secured at an end face portion 16a of the second pulley section 16 which end face portion is located opposite the connecting part at which the first and second pulley sections are connected with each other. The flange plate member 22 is fixed to the end face portion 16a of the second pulley section 16a together with an end face portion 20c of the reinforcement plate member 20 by spot welding. As shown, a through-hole 24 is so formed as to pierce the flange plate member 22, and end face portions 16a, 20c of the second pulley section 16 and the reinforcement plate member 20. The crankshaft pulley 10 of this embodiment is secured onto the tip of one end of the crankshaft by means of a bolt (not shown) passing through the through-hole 24.

As shown, a suitable clearance is formed between the main body second pulley section 16 and the reinforcement member cylindrical portion 20b. Disposed within the clearance is a resilient member 26 which is made of a material having vibration damping capacity, for example, rubber. Although it is sufficient that the resilient member 26 is simply put between the main body 12 and the reinforcement plate member 20, it is preferable that the resilient member 26 is stuck on the surface of the main body and the reinforcement member, for example, by heating or baking.

In the thus formed crankshaft pulley 10, since almost all parts of the crankshaft pulley are formed of sheet metal of mild steel, the weight of the crankshaft pulley can be greatly reduced as compared with conventional crankshaft pulleys. Besides, a sufficient rigidity can be obtained in the crankshaft pulley by virtue of the reinforcement plate members 18, 20, and accordingly the membrane vibration, due to crankshaft vibration, of the crankshaft pulley can be effectively suppressed. It is to be particularly noted that the crankshaft pulley is less in mass for its rigidity, so that the resonance frequency of the crankshaft pulley rises, thereby greatly reducing noise offensive to the ear. Furthermore, although high frequency vibration whose frequency is not less than 1 KHz develops in the second pulley section 16 upon engagement of the second pulley section and the cogged belt, such high frequency vibrations are damped by virtue of the resilient member 26 in contact with the second pulley section 16, thus preventing noise generation inherent in cogged belts.

While the invention has been particularly shown and described with reference to the preferred embodiment thereof, it will be understood that the other changes in form and details can be made therein without departing from the spirit and scope of the invention, in which, for example, the first pulley section 14 and the reinforcement plate member cylindrical portion 20b may be integral with each other by forming them from the same sheet metal blank, and the second pulley section 16 and the reinforcement plate member 18 may be integral with each other by forming them from the same sheet metal blank; and then the both may be secured to each other by spot welding. Additionally, the crankshaft pulley may be provided with two pulleys for V-belts one of which is used for driving a compressor of an automative air conditioning system.

As appreciated from the above, the crankshaft pulley according to the present invention is provided with the first pulley section for use with the V-belt to drive engine accessories and the second pulley section for use with the cogged belt to drive the camshaft, which first and second pulley sections are formed of sheet metal and integrally connected with each other. Therefore, the crankshaft pulley according to the present invention is greatly reduced in weight as compared with conventional ones formed by casting or the like, while obtaining a sufficient rigidity to suppress noise generation. As a result, the present invention contributes to engine weight reduction and noise reduction.

What is claimed is:

1. A crankshaft pulley of an internal combustion engine having a crankshaft, comprising:
    a first pulley section for use with a V-belt to drive at least an engine asccessory, said first pulley section being formed of sheet metal and including an annular groove portion over which said V-belt passes, and an annular flat portion which is perpendicular to an axis of said crankshaft;
    a second pulley section for use with a cogged belt to drive a camshaft of the engine, said second pulley section being formed of sheet metal and securely connected with said first pulley section, said second pulley section being generally cylindrical and having a cylindrical outer surface with a plurality of teeth, each of said teeth extending along an axis of said cylindrical second pulley section and being formed in the sheet metal of said second pulley section, said first and second pulley sections being completely integral with each other and formed of a single blank of sheet metal, said first and second pulley sections constituting a main body of said crankshaft pulley;
    first and second reinforcement members connected to said main body on opposite sides of said main body, said first reinforcement member being formed of sheet metal and including a flat portion in contact with said first pulley section annular flat portion, and a cylindrical portion in contact with an outer cylindrical surface of said second pulley section, said second reinforcement member being formed of sheet metal and including a flat portion in contact with said first pulley section annular flat portion, and a cylindrical portion located inside of said cylindrical second pulley section; and
    an annular resilient member disposed between said cylindrical second pulley section and said second reinforcement member cylindrical portion.

2. A crankshaft pulley as claimed in claim 1, wherein said first reinforcement member includes an annular flange located on an outer surface of said second pulley section annular flat portion and extending radially outward and a circular plate member secured to an end of said second pulley section opposite the first pulley section flat portion, said annular flange and said circular plate member defining a groove therebetween for guiding a cogged belt.

3. A crankshaft pulley as claimed in claim 1, wherein said cylindrical second pulley section is formed by drawing a central part of a blank of sheet metal into a cylindrical form.

4. A crankshaft pulley as claimed in claim 3, wherein said teeth of said second pulley section are formed by bulging.

* * * * *